United States Patent
Ito et al.

(10) Patent No.: US 8,085,557 B2
(45) Date of Patent: Dec. 27, 2011

(54) BIDIRECTIONAL DC/AC INVERTER

(75) Inventors: Hiroo Ito, Kariya (JP); Takafumi Mizuno, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 669 days.

(21) Appl. No.: 12/220,111

(22) Filed: Jul. 23, 2008

(65) Prior Publication Data

US 2009/0034300 A1 Feb. 5, 2009

(30) Foreign Application Priority Data

Jul. 24, 2007 (JP) ................................ 2007-192423

(51) Int. Cl.
*H02M 3/335* (2006.01)
(52) U.S. Cl. ........................................ 363/17
(58) Field of Classification Search .................... 363/17, 363/37, 98
See application file for complete search history.

(56) References Cited

U.S. PATENT DOCUMENTS

| | | | |
|---|---|---|---|
| 6,330,170 B1 * | 12/2001 | Wang et al. ..................... | 363/17 |
| 6,654,261 B2 * | 11/2003 | Welches et al. ................ | 363/131 |
| 6,876,556 B2 * | 4/2005 | Zhu et al. ......................... | 363/17 |
| 7,450,401 B2 * | 11/2008 | Iida ................................. | 363/16 |
| 2003/0012038 A1 * | 1/2003 | Welches et al. ................ | 363/34 |
| 2005/0180176 A1 * | 8/2005 | Coulibaly ........................ | 363/17 |
| 2008/0316774 A1 * | 12/2008 | Ito et al. ........................... | 363/17 |

FOREIGN PATENT DOCUMENTS

| | | |
|---|---|---|
| JP | 11-356051 | 12/1999 |
| JP | 2003-143772 | 5/2003 |

OTHER PUBLICATIONS

Wang, High-frequency Quasi-Single-Stage (QSS) Isolated AC-AC and DC-AC power Conversion, Nov. 16, 1998, ETD etd, Chapter 3, pp. 42-71.*

* cited by examiner

*Primary Examiner* — Jue Zhang
(74) *Attorney, Agent, or Firm* — Locke Lord Bissell & Liddell LLP

(57) ABSTRACT

A bidirectional DC-AC inverter is disclosed. The DC-AC inverter includes an H bridge circuit, a connecting portion connected to the H bridge circuit, a smoothing filter that connects the connecting portion to the H bridge circuit, and a control section. The H bridge circuit has four switching elements. The four switching elements include two first switching elements first ends of which are connected to each other and two second switching elements second ends of which are connected to each other. The smoothing filter has a capacitor and two coils connected to the capacitor. The control section controls the first switching elements in such a manner that the two coils function as booster coils when an alternating voltage input from a system power supply is converted to a direct current voltage.

8 Claims, 3 Drawing Sheets

BIDIRECTIONAL DC/AC INVERTER

BACKGROUND OF THE INVENTION

The present invention relates to a bidirectional DC-AC inverter, and, more particularly, to a bidirectional DC-AC inverter that converts a direct current voltage input from a battery of a voltage higher than the voltage of a system power supply to an alternating voltage equal to the voltage of the system power supply and converts the alternating voltage input from the system power supply to a direct current voltage with which the battery is charged.

A hybrid car that is provided with an engine (internal combustion engine) has been applied to a practical use. In the hybrid car, drive wheels are driven by a motor at starting or in a lower speed range and the drive wheels are driven by the engine in middle and higher speed ranges to reduce fuel consumption and exhaust gas. Recently, a plug-in hybrid car that is provided with a battery that can be charged by a system power supply or a domestic power supply has been proposed to further reduce environmental load. For example, when a motor is driven by a battery that is charged with midnight power, a car can run a longer distance in an electric vehicle mode and the ratio of using electric power is increased compared to the ratio of using gasoline or other fuels. Therefore, compared to a general hybrid car, it is expected to reduce an emission of carbon dioxide and suppress air pollution. Since the system power supply reduces cost compared to generating electric power separately, a fuel cost can be reduced if a battery is charged with low-cost midnight power.

The system power supply outputs a sinusoidal alternating voltage and a sinusoidal alternating current. A charger used to charge a battery includes a capacitor input type rectifier circuit. An alternating current output from the rectifier circuit is, as illustrated in FIG. 5A, a harmonic current that flows only in the proximity of the peak of the alternating voltage provided by the system power supply. To improve power factor and suppress harmonic currents, a PFC (power factor control) circuit must be connected to the rectifier circuit. With reference to FIG. 5B, the PFC circuit converts an alternating current (a harmonic current) output from the rectifier circuit to a sinusoidal current waveform the phase of which coincides with the phase of the alternating voltage.

Japanese Laid-Open Patent Publication No. 11-356051 discloses a simply configured power supply device that increases efficiency of improving the power factor. As illustrated in FIG. 6, the power supply device includes a power factor improving circuit 71 and a memory 72. The power factor improving circuit 71 operates in such a manner that the phase of an alternating voltage and the phase of an alternating current input from an alternating current power supply AC (a system power supply) coincide with each other. The memory 72 stores information on a reference waveform. The power factor improving circuit 71 has diodes D1, D2, D3, D4, a reactor L, switching elements S1, S2, and a smoothing capacitor C. The diodes D1 to D4 rectify the alternating voltage and the alternating current input from the alternating current power supply AC. The reactor L and the switching elements S1, S2 forcibly cause the alternating current power supply AC to input an electric current. The smoothing capacitor C provides a smoothed direct current output. The power supply device includes an electric current detection circuit 73, a voltage detection circuit 74, a zero cross detection circuit 75, and a power factor control section 76. The electric current detection circuit 73 detects an input current. The voltage detection circuit 74 detects an output voltage. The zero cross detection circuit 75 detects a point of time when the polarity of the alternating voltage changes. The power factor control section 76 controls the power factor improving circuit 71. The power factor control section 76 includes a determining section 77 and a PWM control section 78. The determining section 77 determines a duty cycle by which the switching elements S1, S2 are subjected to PWM control. The PWM control section 78 outputs control signals in correspondence with which the switching elements S1, S2 are selectively turned on and off by the determined duty cycle. Specifically, the power factor control section 76 selectively turns on and off the switching elements S1, S2 by the duty cycle determined based on an input current value, an output voltage value, and the value of the reference waveform read out from the memory 72 with reference to the time point when the polarity of the alternating voltage changes. The power supply device improves the power factor by adjusting the duty cycle of the switching elements S1, S2.

Japanese Laid-Open Patent Publication No. 2003-143772 discloses an uninterruptible power supply device, which operates in the following manner. Specifically, if a power failure occurs, the device quickly switches the power supply to a load from a commercial alternating current power supply (a system power supply) to an inverter, without causing a short circuit between the commercial alternating current power supply and the inverter. The device also prevents a magnetizing inrush current from flowing through the inverter. The inverter is a bidirectional inverter that operates to charge a battery in a normal state and, if the voltage of the commercial power supply drops or the power is interrupted, converts a direct current output from the battery to an alternating current to supply the alternating current to the load. The inverter includes an H bridge circuit including four switching elements. When charging the battery, two of the four switching elements are turned off and the other two are selectively switched on and off.

The rated voltage of a traveling motor mounted in a plug-in type hybrid vehicle is higher (for example, several hundreds of volts) than the voltage of the system power supply. Thus, use of a battery with a rated voltage higher than the voltage of the system power supply improves the efficiency by which the power of the battery is consumed. In this case, the voltage output from the system power supply must be raised when the battery is charged by the system power supply. However, if two circuits including a booster circuit, which raises the voltage from the system power supply, and a PFC circuit are provided separately from each other, a reactor (a coil) for the booster circuit and a coil for the PFC circuit must be employed separately from each other. This increases the size of the device and raises the manufacturing costs.

SUMMARY OF THE INVENTION

Accordingly, it is an objective of the present invention to provide a bidirectional DC-AC inverter that charges a battery with a voltage higher than a voltage of a system power supply without employing a dedicated booster circuit.

To achieve the forgoing objective and in accordance with one aspect of the present invention, a bidirectional DC-AC inverter is provided that converts a direct current voltage input from a battery with a voltage higher than a voltage of a system power supply to an alternating voltage equal to the voltage of the system power supply, and converts an alternating voltage input from the system power supply to a direct current voltage with which the battery is charged. The inverter includes an H bridge circuit, a connecting portion, a smoothing filter, and a control section. The H bridge circuit converts the direct current voltage input from the battery to the alternating voltage and converts the alternating voltage input from the system power supply to the direct current voltage. The H bridge circuit includes four switching elements each having a first end and a second end, the four switching elements including two first switching elements the first ends of which are connected to each other, and two second switching elements the second ends of which are connected to each other. The connecting portion is connected to the H bridge circuit. The smoothing filter connects the connecting portion to the H bridge circuit, and has a capacitor and two coils connected to the capacitor. The control section controls the switching elements. When the alternating voltage input from the system power supply is converted to the direct current voltage with which the battery is charged, the control section controls the first switching elements in such a manner that the two coils function as booster coils.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a circuit diagram representing a prior art power supply device.

DESCRIPTION OF THE PREFERRED EMBODIMENTS

A power supply device 12 of a plug-in type hybrid vehicle according to a first embodiment of the present invention will now be described with reference to FIGS. 1 to 3B.

Figure 1:
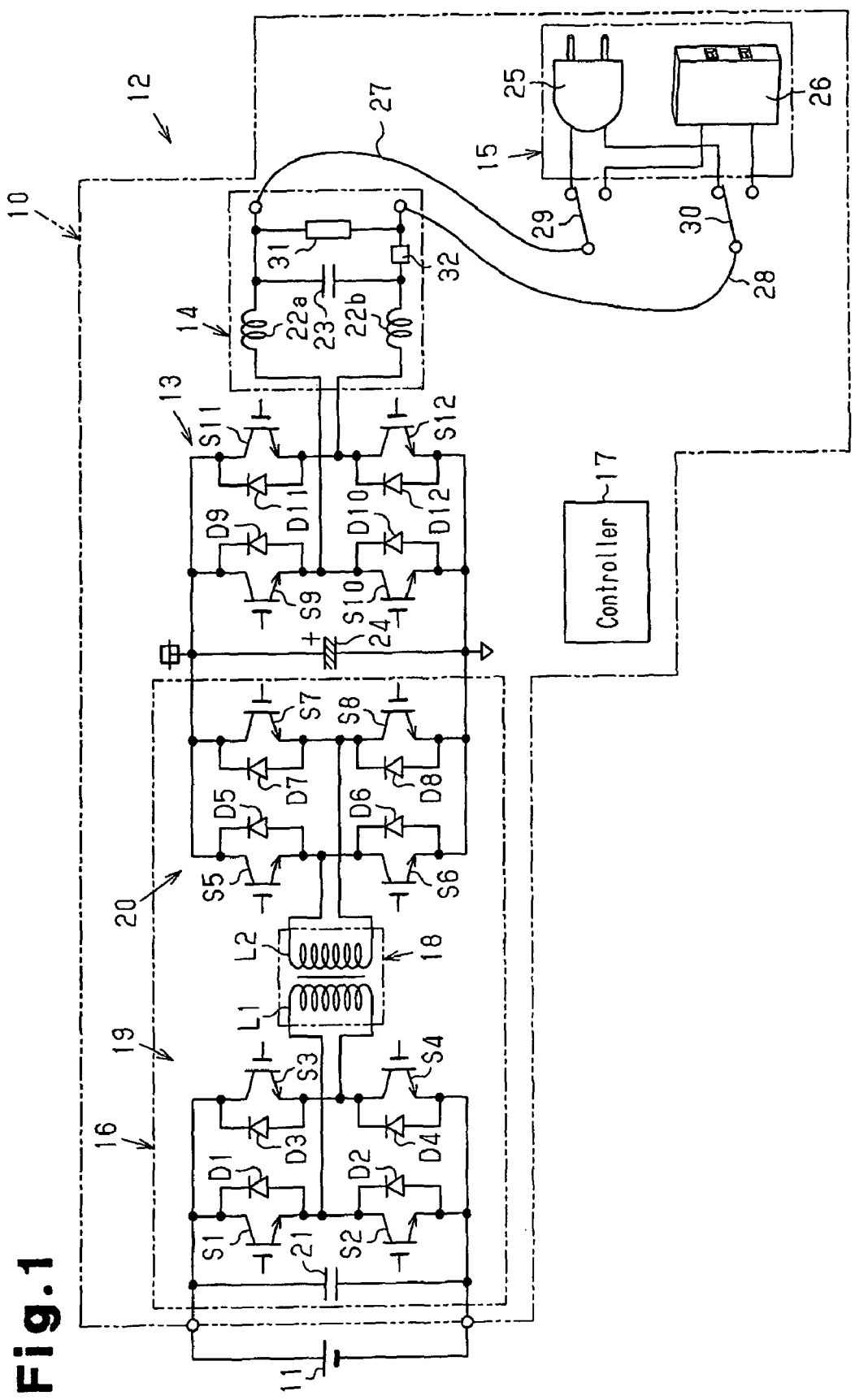
FIG. 1 is a circuit diagram representing a power supply device according to an embodiment of the present invention.

As illustrated in FIG. 1, the power supply device 12 has a bidirectional DC-AC inverter 10 and a battery 11, which is a direct current power supply connected to the inverter 10. The inverter 10 includes a first H bridge circuit 13, a connecting portion 15, an insulated transmitting portion 16, and a controller 17. The connecting portion 15 is connected to the first H bridge circuit 13 through a smoothing filter 14. The insulated transmitting portion 16 is connected to the battery 11 and the first H bridge circuit 13. The controller 17 serves as a control section that controls the first H bridge circuit 13 and the insulated transmitting portion 16.

The output voltage of the battery 11 is lower than a voltage (for example, 500 V) that drives the traveling motor of the vehicle and higher than a voltage (for example, 100 V) of a system power supply. The output voltage of the battery 11 is, for example, 200 V.

The insulated transmitting portion 16 has a transformer 18, a second H bridge circuit 19, and a third H bridge circuit 20. The second H bridge circuit 19 connects the battery 11 to a primary winding L1 of the transformer 18. The third H bridge circuit 20 connects a secondary winding L2 of the transformer 18 to the first H bridge circuit 13. The second H bridge circuit 19 has four switching elements S1, S2, S3, S4. Each of the switching elements S1 to S4 is an insulated gate bipolar transistor (IGBT). In each of the switching elements S1 to S4, the corresponding one of diodes D1, D2, D3, D4 is connected in antiparallel between a collector and an emitter. In other words, the cathode of each of the diodes D1 to D4 is connected to the collector of the corresponding one of the switching elements S1 to S4. The anode of each diode D1 to D4 is connected to the emitter of the corresponding switching element S1 to S4.

The collector of the switching element S1 is connected to the positive terminal of the battery 11 and the emitter of the switching element S1 is connected to the collector of the switching element S2. The emitter of the switching element S2 is connected to the negative terminal of the battery 11. A first end of the primary winding L1 of the transformer 18 is connected to a node between the emitter of the switching element S1 and the collector of the switching element S2. The collector of the switching element S3 is connected to the positive terminal of the battery 11 and the emitter of the switching element S3 is connected to the collector of the switching element S4. The emitter of the switching element S4 is connected to the negative terminal of the battery 11. A second end of the primary winding L1 of the transformer 18 is connected to a node between the emitter of the switching element S3 and the collector of the switching element S4. A capacitor 21 is connected between the two terminals of the battery 11.

The third H bridge circuit 20 has four switching elements S5, S6, S7, S8. Each of the switching elements S5 to S8 is an insulated gate bipolar transistor (IGBT). In each of the switching elements S5 to S8, a corresponding one of diodes D5, D6, D7, D8 is connected in antiparallel between a collector and an emitter. In other words, the cathode of each diode D5 to D8 is connected to the collector of the corresponding switching element S5 to S8. The anode of each diode D5 to D8 is connected to the emitter of the corresponding switching element S5 to S8. The collectors of the switching elements S5, S7 are connected to each other. The emitters of the switching elements S6, S8 are connected to each other. A first end of a secondary winding L2 of the transformer 18 is connected to a node between the emitter of the switching element S5 and the collector of the switching element S6. A second end of the secondary winding L2 of the transformer 18 is connected to a node between the emitter of the switching element S7 and the collector of the switching element S8.

The first H bridge circuit 13 has four switching elements S9, S10, S11, S12. Each of the switching elements S9 to S12 is an insulated gate bipolar transistor (IGBT). In each of the switching elements S9 to S12, a corresponding one of diodes D9, D10, D11, D12 is connected in antiparallel between a collector (a second terminal) and an emitter (a first terminal). The cathode of each diode D9 to D12 is connected to the collector of the corresponding switching element S9 to S12. The anode of each diode D9 to D12 is connected to the emitter of the corresponding switching element S9 to S12. The collectors (the second terminals) of the switching elements S9, S11 are connected to each other and the collectors of the switching elements S5, S7 of the third H bridge circuit 20. The emitters (the first terminals) of the switching elements S10, S12 are connected to each other and the emitters of the switching elements S6, S8 of the third H bridge circuit 20. The emitter of the switching element S9 is connected to the collector of the switching element S10. The emitter of the switching element S11 is connected to the collector of the switching element S12.

A node between the emitter of the switching element S9 and the collector of the switching element S10 is connected to a first end of a coil 22a of the smoothing filter 14. A second end of the coil 22a is connected to a first end of a capacitor 23. A node between the emitter of the switching element S11 and the collector of the switching element S12 is connected to a first end of a coil 22b of the smoothing filter 14. A second end of the coil 22b is connected to a second end of the capacitor 23. An electrolytic capacitor 24 is connected between the collector of the switching element S9 and the emitter of the switching element S10.

The connecting portion 15 has a plug 25 and an outlet 26. The plug 25 is connectable to the outlet of the system power supply. The outlet 26 serves as an adapter that is connectable to a plug of a home electric appliance. The plug 25 and the outlet 26 are connected to the capacitor 23 of the smoothing filter 14 through a cable 27 and a cable 28, respectively. A switch 29 is provided between the cable 27 and the connecting portion 15, and a switch 30 is provided between the cable 28 and connecting portion 15. Each of the switches 29, 30 is a changeover contact of a relay. When the relays are turned on, the switches 29, 30 are maintained in such a state that conduction from the plug 25 to the smoothing filter 14 is allowed. When the relays are turned off, the switches 29, 30 are maintained in such a state that conduction from the outlet 26 to the smoothing filter 14 is allowed.

The controller 17 has a non-illustrated microcomputer and selectively switches on and off the switching elements S1 to S12 in accordance with programs stored in the memory of the computer. To charge the battery 11, the controller 17 maintains the switching elements S9, S11 of the first H bridge circuit 13 off and operates the switching elements S10, S12 in such a manner that an alternating voltage input from a non-illustrated system power supply through the plug 25 is converted into a direct current voltage and the coils 22a, 22b function as booster coils. Also, the controller 17 controls the switching elements S9 to S12 of the first H bridge circuit 13 in such a manner that a direct current voltage output from the battery 11 through the insulated transmitting portion 16 is converted to an alternating voltage and output to the smoothing filter 14. The controller 17 outputs control signals in accordance with which the connection states of the switches 29, 30 are controlled.

When charging the battery 11, the controller 17 controls the switching elements S10, S12 of the first H bridge circuit 13 in such a manner that the phase of the alternating current coincides with the phase of the alternating voltage.

A non-illustrated load (which is, for example, a traveling motor or an auxiliary device) necessary for causing the vehicle to travel is connected to the battery 11 and consumes power.

Operation of the bidirectional DC-AC inverter 10 will hereafter be explained.

When the direct current voltage input from the battery 11 is converted to the alternating voltage equal to the voltage of the system power supply, the switches 29, 30 are maintained in such a state that conduction from the outlet 26 to the smoothing filter 14 is allowed while the direct current voltage is supplied from the battery 11 to the second H bridge circuit 19.

The switching elements S1 to S4 of the second H bridge circuit 19 are selectively switched on and off in accordance with the control signals output from the controller 17 in such a manner that the direct current voltage supplied by the battery 11 is converted to an alternating voltage. The alternating voltage is then supplied to the primary winding L1 of the transformer 18. Specifically, the switching elements S1, S4 and the switching elements S2, S3 are switched on and off alternately. As a result, the alternating voltage is supplied to the primary winding L1. This induces an alternating voltage in the secondary winding L2.

The switching elements S5 to S8 of the third H bridge circuit 20, which are connected to the secondary winding L2, are selectively switched on and off in accordance with the control signals of the controller 17 in such a manner that the alternating voltage induced in the secondary winding L2 is converted to a direct current voltage. The direct current voltage is then supplied to the first H bridge circuit 13. The switching elements S9 to S12 are selectively switched on and off in accordance with the control signals of the controller 17 in such a manner that an alternating voltage with a predetermined voltage and a predetermined frequency (which is, for example, 100 V and 60 Hz) output from the outlet 26. Specifically, the switching elements S9, S12 and the switching elements S10, S11 are switched on and off alternately. When the switching elements S9, S12 are on and the switching elements S10, S11 are off, an electric current flowing from the first terminal to the second terminal of the coil 22a, as indicated by the double-dotted chain lines in FIG. 2, passes through the coil 22a. As a result, the direct current voltage input from the third H bridge circuit 20 has a positive rectangular waveform. The positive rectangular wave is rectified to a positive sine wave by the smoothing filter 14.

Figure 2:
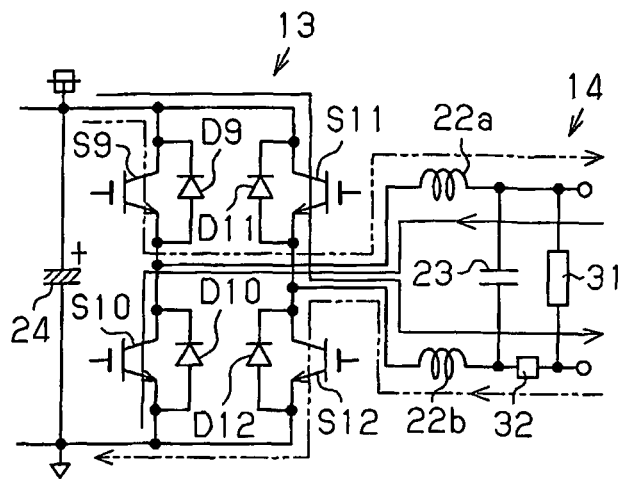
FIG. 2 is a circuit diagram showing a portion of the power supply device shown in FIG. 1, for explaining an operation of the power supply device.

Contrastingly, when the switching elements S9, S12 are off and the switching elements S10, S11 are on, an electric current flows from the second terminal to the first terminal in the coil 22a, as indicated by the solid lines in FIG. 2. As a result, the direct current voltage input from the third H bridge circuit 20 has a negative rectangular waveform. The smoothing filter 14 rectifies the negative rectangular wave to a negative sine wave.

As has been described, the direct current voltage input from the battery 11 is converted to the alternating voltage, which is supplied to the outlet 26.

In contrast, in order to convert an alternating voltage input from the system power supply to a direct current voltage with which a battery is charged, that is, to charge the battery 11 using the system power supply, the plug 25 is connected to the outlet of the system power supply (for example, a domestic outlet of 100 V). The switches 29, 30 are maintained in such a state that conduction from the plug 25 to the smoothing filter 14 is allowed. As a result, an alternating voltage is supplied from the system power supply to the first H bridge circuit 13 through the plug 25 and the smoothing filter 14. The switching elements S9 to S12 of the first H bridge circuit 13 are selectively turned on and off in accordance with the control signals of the controller 17 in such a manner that the alternating voltage supplied from the system power supply is converted to a direct current voltage. The direct current voltage is then supplied to the third H bridge circuit 20. At this stage, the switching elements S9 to S12 are controlled in such a manner that the coils 22a, 22b of the smoothing filter 14 function as booster coils and the phase of the alternating current coincides with the phase of the alternating voltage.

Figure 3A:
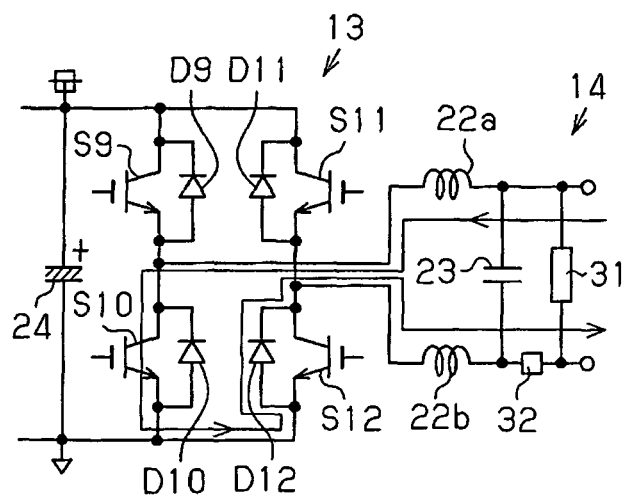
FIGS. 3A and 3B are circuit diagrams representing a first H bridge circuit of the power supply device shown in FIG. 1, for explaining an operation of the first H bridge circuit.
Figure 3B:
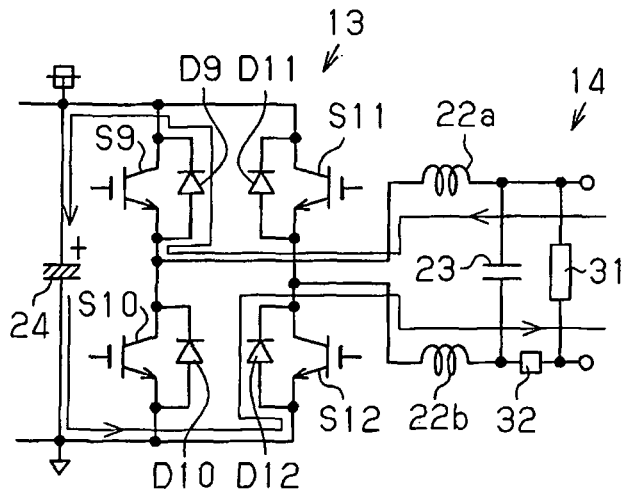

Specifically, in the first H bridge circuit 13, the switching elements S9, S11 are maintained off and the switching elements S10, S12 are switched on and off alternately. In other words, when the alternating voltage and the alternating current input to the smoothing filter 14 are positive, the switching elements S9, S11, S12 are maintained off and the switching element S10 is selectively switched on and off. When the switching element S10 is on, an electric current flows from the coil 22a to the switching element S10, the diode D12, and then the coil 22b, as illustrated in FIG. 3A. In this manner, electric energy accumulates in the coils 22a, 22b. When the switching element S10 is turned off, an electric current flows from the coil 22a to the diode D9, the electrolytic capacitor 24, the diode D12, and then the coil 22b, with reference to FIG. 3B, with the energy accumulated in the coils 22a, 22b added to the current.

The switching element S10 is controlled by the duty cycle calculated from the output voltage of the first H bridge circuit 13, the voltage detected by a voltage sensor 31 of the smoothing filter 14, the target value of the alternating current output from the smoothing filter 14, and the current detected by an electric current sensor 32. The target value of the alternating current from the smoothing filter 14 is necessary for outputting a direct current voltage with which the battery 11 is charged from the first H bridge circuit 13.

By controlling the switching element S10 by the duty cycle that has been calculated in the above-described manner, the phase of the alternating current coincides with the phase of the alternating voltage and thus the power factor increases. Further, the direct current voltage obtained by raising the positive alternating voltage, which is input to the smoothing filter 14, is output from the first H bridge circuit 13.

When the alternating voltage and the alternating current input to the smoothing filter 14 are negative, the switching elements S9, S10, S11 are maintained off while the switching element S12 is selectively turned on and off.

When the switching element S12 is turned on, an electric current flows from the coil 22b to the switching element S12, the diode D10, and then the coil 22a. This accumulates electric energy in the coils 22a, 22b. When the switching element S12 is turned off, with the energy accumulated in the coils 22a, 22b, an electric current flows from the coil 22b to the diode D11, the electric capacitor 24, the diode D10, and then the coil 22a.

The switching element S12 is controlled by the duty cycle calculated from the output voltage of the first H bridge circuit 13, the voltage detected by the voltage sensor 31, the target value of the alternating current output from the smoothing filter 14, and the current detected by the electric current sensor 32. The target value of the alternating current from the smoothing filter 14 is necessary for outputting the direct current voltage with which the battery 11 is charged from the first H bridge circuit 13.

By controlling the switching element S12 by the duty cycle that has been calculated in the above-described manner, the phase of the alternating current coincides with the phase of the alternating voltage and thus the power factor increases. Further, the direct current voltage obtained by raising the negative alternating voltage, which is input to the smoothing filter 14, is output from the first H bridge circuit 13.

The switching elements S5 to S8 of the third H bridge circuit 20 are selectively turned on and off in accordance with the control signals output from the controller 17 in such a manner that the direct current voltage supplied by the first H bridge circuit 13 is converted to an alternating voltage. The alternating voltage is then supplied to the secondary winding L2 of the transformer 18. As a result, an alternating voltage is induced in the primary winding L1 of the transformer 18. By controlling the switching elements S1 to S4 of the second H bridge circuit 19, the alternating voltage induced in the primary winding L1 is converted to a direct current voltage, which charges the battery 11.

Specifically, the switching elements S1 to S4 are controlled to be maintained off.

When an electric current flowing from the second end to the first end of the primary winding L1 is induced in the transformer 18, the electric current flows from the first end of the primary winding L1 to the diode D1, the battery 11 and the capacitor 21, the diode D4, and then the second end of the primary winding L1. As a result, the battery 11 is charged. When an electric current flowing from the first end to the second end of the primary winding L1 is induced in the transformer 18, the electric current flows from the second end of the primary winding L1 to the diode D3, the battery 11 and the capacitor 21, the diode D2, and then the first end of the primary winding L1. The battery 11 is thus charged.

The illustrated embodiment has the following advantages.

(1) The inverter 10 has the first H bridge circuit 13. The first H bridge circuit 13 converts the alternating voltage input from the system power supply to a direct current voltage when the battery 11 is to be charged. The first H bridge circuit 13 converts the direct current voltage input from the insulated transmitting portion 16 to an alternating voltage when the inverter 10 is to output the alternating voltage to the exterior. The first H bridge circuit 13 is connected to the connecting portion 15 through the smoothing filter 14 including the coils 22a, 22b and the capacitor 23. The controller 17 controls the switching elements S9 to S12 of the first H bridge circuit 13 and the switching elements S1 to S8 of the insulated transmitting portion 16. Further, the controller 17 controls the switching elements S9 to S12 of the first H bridge circuit 13 in such a manner that the coils 22a, 22b function as the booster coils when the battery 11 is to be charged. Thus, the battery 11 with the voltage higher than the voltage of the system power supply is charged without employing a dedicated booster circuit.

(2) The switching elements S10, S12 are each controlled by the duty cycle calculated from the output voltage of the first H bridge circuit 13, the voltage detected by the voltage sensor 31, the target value of the alternating current output from the smoothing filter 14, and the current detected by the electric current sensor 32. The target value of the alternating current from the smoothing filter 14 is necessary for outputting a direct current voltage with which the battery 11 is charged from the first H bridge circuit 13. In this manner, the phase of the alternating current coincides with the phase of the alternating voltage and thus the power factor increases. Further, the alternating voltage input to the first H bridge circuit 13 is raised. In other words, the battery with the voltage higher than the voltage of the system power supply is efficiently charged without using a specific PFC (power factor control) circuit or a dedicated booster circuit.

(3) The switching elements S9 to S12 of the first H bridge circuit 13 and the switching elements S1 to S8 of the insulated transmitting portion 16 are the insulated gate bipolar transistors (IGBTs) in which the corresponding diodes D9 to D12 and D1 to D8 are connected in antiparallel. Thus, if the current flowing in the switching elements S1 to S12 is great (for example, not less than 100 A), the switching elements S1 to S12 each exhibit an improved durability.

(4) The controller 17 maintains the switching elements S9, S11 of the first H bridge circuit 13 off and selectively turns on and off the switching elements S10, S12 when the battery 11 is charged. This simplifies control of the switching elements S1 to S4.

(5) In the insulated transmitting portion 16, the second H bridge circuit 19 and the third H bridge circuit 20 are connected to each other through the transformer 18. The circuits including the battery 11 are thus electrically insulated from the circuits connected to the system power supply through the transformer 18. This prevents supply of the voltage of the battery 11, which is higher than the voltage of the system power supply, to the connecting portion 15 when the inverter 10 is maintained off.

(6) The power supply device 12 is mounted in a vehicle. The power supply device 12 thus allows the vehicle battery 11 to be used for home electric appliances when the system power supply is unavailable due to, for example, a disaster. Further, compared to general hybrid vehicles, the power supply device 12 effectively reduces the emission of carbon dioxide and prevents air pollution. Also, since the battery 11 may be charged utilizing midnight power supply, the hybrid vehicle can decrease fuel consumption.

(7) The power supply device 12 has the plug 25 connectable to the outlet of the power system supply and the outlet 26 to which a plug of a home electric appliance is connectable. Thus, if the battery 11 is charged using the midnight power supply and the power produced by the battery 11 is consumed in daytime, the cost of power consumption decreases.

The present invention is not restricted to the illustrated embodiment but may be embodied in the following forms.

Figure 4:
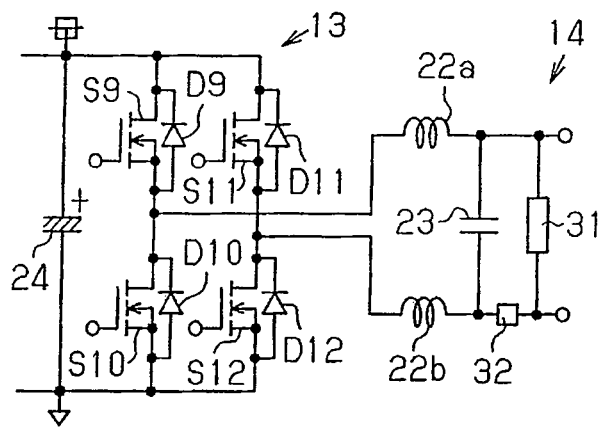
FIG. 4 is a circuit diagram representing a first H bridge circuit of a modified embodiment.
Figure 5A:
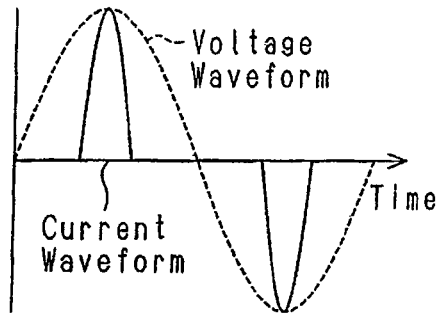
FIG. 5A is a waveform diagram representing an alternating voltage and an alternating current in a case without a PFC circuit.
Figure 5B:
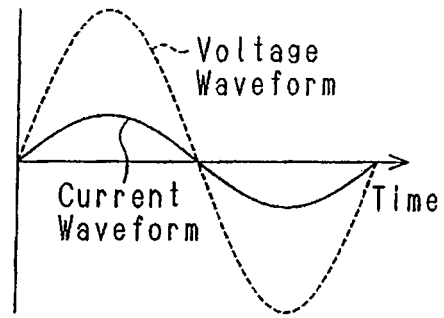
FIG. 5B is a waveform diagram representing an alternating voltage and an alternating current in a case with a PFC circuit.
Figure 5B:
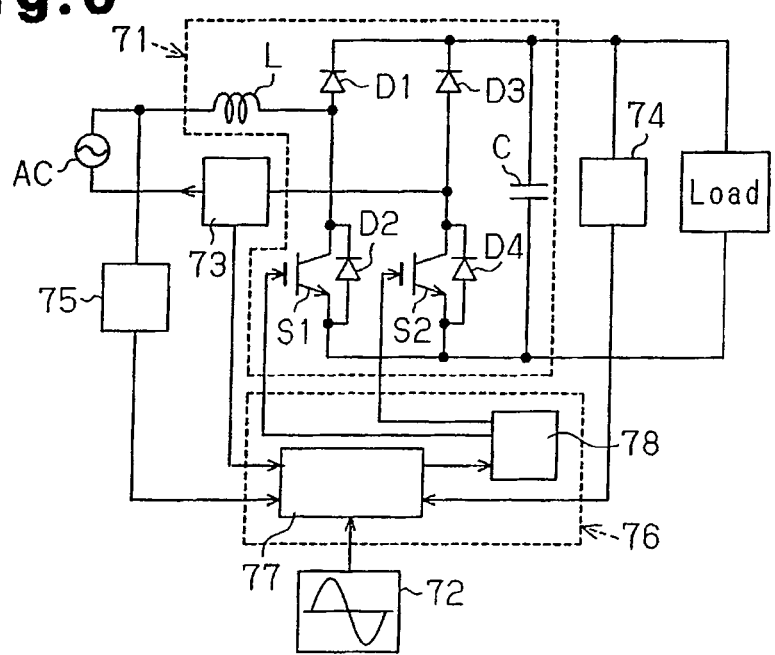

As illustrated in FIG. 4, the switching elements S9 to S12 of the first H bridge circuit 13 may be MOSFETs. A MOSFET has a parasitic diode. Thus, unlike the case in which an IGBT without a parasitic diode is employed as a switching element, the use of the MOSFETs eliminates the necessity to connect diodes, thus simplifying the configuration. Further, when the battery 11 is to be charged using the system power supply, the switching elements S9, S11 may be maintained off while the switching elements S10 and S11 are turned on simultaneously and the switching elements S9 and S12 are turned on simultaneously. The ON voltage of each diode is approximately 1 V. However, if an electric current is caused to flow in the direction of the diode with the MOSFET maintained on, power consumption decreases compared to the case in which an electric current is caused to flow through the diode with the MOSFET maintained off. This reduces loss.

The switching elements employed in the second H bridge circuit 19 and the third H bridge circuit 20 of the insulated transmitting portion 16 may be formed by MOSFETs, instead of the IGBTs.

In a hybrid vehicle, a motor generator is used as a traveling motor. When the motor generator functions as a power generator, the generated power is used to charge the battery 11. However, the inverter 10 may be configured in such a manner as to output the power generated by the motor generator directly from the connecting portion 15, without using the power to charge the battery 11.

The turns ratio of the primary winding L1 to the secondary winding L2 of the transformer 18 of the insulated transmitting portion 16 may be 1:1 or else. When the turns ratio between the primary and secondary windings L1, L2 is 1:1, the transformer 18 functions solely to ensure insulation between the circuits corresponding to the connecting portion 15 and the circuits corresponding to the battery 11. However, if the turns ratio is other than 1:1, the transformer 18 may raise or lower the voltage of the battery 11. For example, the turns ratio of the transformer 18 may be set to such a ratio that the voltage of the battery 11 can be reduced to the voltage output from the connecting portion 15.

As long as the insulated transmitting portion 16 is capable of electrically insulating the connecting portion 15 from the battery 11, the insulated transmitting portion 16 may be configured in any suitable manner. For example, the transformer 18 may be replaced by a photo-coupler.

The vehicle does not necessarily have to be a hybrid type. That is, the vehicle may be an electric vehicle using a battery or combination of a fuel cell and a battery as its power supply.

The voltage of the battery 11 is not restricted to 200 V but may be higher or lower than 200 V as long as the voltage is higher than the voltage of the system power supply.

As long as the alternating voltage supplied to the outlet 26 has the specific voltage and frequency of a home electric appliance, the alternating current is not restricted to 100 V and 60 Hz. For example, the alternating current may be 100 V and 50 Hz, 200 V and 50 Hz, or 200 V and 60 Hz. Further, if the power supply device 12 is used outside Japan, it is preferred that a voltage and a frequency matching the standard of the system power supply of that country be employed.

The switches 29, 30 are not restricted to the changeover contacts of the relays but may be configured as manual switches.

The power supply device 12 is not restricted to use in a vehicle. For example, the power supply device 12 may be used as a power supply in a factory, an office, or a home. In this case, the battery 11 is charged using the midnight power supply so that the power produced by the battery 11 can be used in daytime.

What is claimed is:

1. A bidirectional DC-AC inverter that converts a direct current voltage input from a battery with a voltage higher than a voltage of a system power supply to an alternating voltage equal to the voltage of the system power supply, and converts an alternating voltage input from the system power supply to a direct current voltage with which the battery is charged, the inverter comprising:
   an H bridge circuit that coverts the direct current voltage input from the battery to the alternating voltage and converts the alternating voltage input from the system power supply to the direct current voltage, the H bridge circuit including four switching elements each having a first end and a second end, the four switching elements including two first switching elements the first ends of which are connected to each other, and two second switching elements the second ends of which are connected to each other;
   a connecting portion connected to the H bridge circuit;
   a smoothing filter connecting the connecting portion to the H bridge circuit, the smoothing filter having a capacitor and two coils connected to the capacitor; and
   a control section that controls the switching elements, wherein, when the alternating voltage input from the system power supply is converted to the direct current voltage with which the battery is charged, the control section controls the first switching elements in such a manner that the two coils function as booster coils;
   wherein the smoothing filter includes a voltage sensor that detects the value of an alternating voltage input to the smoothing filter and an electric current sensor that detects the value of an alternating current input to the smoothing filter, and;
   wherein the control section controls the first switching elements by a duty cycle calculated based on:
   an output voltage supplied from the H bridge circuit;
   the value of the voltage detected by the voltage sensor;
   a target value of an alternating current from the smoothing filter is necessary for outputting the direct current voltage with which the battery is charged from the H bridge circuit; and the value of the electric current detected by the electric current sensor.

2. The inverter according to claim 1, further comprising an insulated transmitting portion that is provided between the H bridge circuit and the battery and electrically insulates the H bridge circuit and the battery from each other.

3. The inverter according to claim 2, wherein the insulated transmitting portion includes a transformer.

4. The inverter according to claim 3, wherein the H bridge circuit is a first H bridge circuit, and wherein the inverter further comprises a second H bridge circuit that connects a primary winding of the transformer to the battery and a third H bridge circuit that connects a secondary winding of the transformer to the first H bridge circuit.

5. The inverter according to claim 1, wherein each of the switching elements of the H bridge circuit is an insulated gate bipolar transistor in which diodes are connected in antiparallel.

6. The inverter according to claim 1, wherein each of the switching elements of the H bridge circuit is a MOSFET.

7. The inverter according to claim 1, wherein, when converting the alternating voltage input from the system power supply to the direct current voltage with which the battery is charged, the control section maintains the second switching elements off and selectively turns on and off the first switching elements.

8. A bidirectional DC-AC inverter that converts a direct current voltage input from a battery with a voltage higher than a voltage of a system power supply to an alternating voltage equal to the voltage of the system power supply, and converts an alternating voltage input from the system power supply to a direct current voltage with which the battery is charged, the inverter comprising:

an H bridge circuit that converts the direct current voltage input from the battery to the alternating voltage and converts the alternating voltage input from the system power supply to the direct current voltage, the H bridge circuit including four switching elements each having a first end and a second end, the four switching elements including two first switching elements the first ends of which are connected to each other, and two second switching elements the second ends of which are connected to each other;

a connecting portion connected to the H bridge circuit;

a smoothing filter connecting the connecting portion to the H bridge circuit, the smoothing filter having a capacitor and two coils connected to the capacitor; and a control section that controls the switching elements, wherein, when the alternating voltage input from the system power supply is converted to the direct current voltage with which the battery is charged, the control section controls the first switching elements in such a manner that the two coils function as booster coils; and wherein, when converting the alternating voltage input from the system power supply to the direct current voltage with which the battery is charged, the control section maintains the second switching elements off and selectively turns on and off the first switching elements.

* * * * *